(No Model.) 2 Sheets—Sheet 2.
W. C. CLARKE.
METHOD OF AND APPARATUS FOR GENERATING ACETYLENE.
No. 556,736. Patented Mar. 24, 1896.
Fig. II.
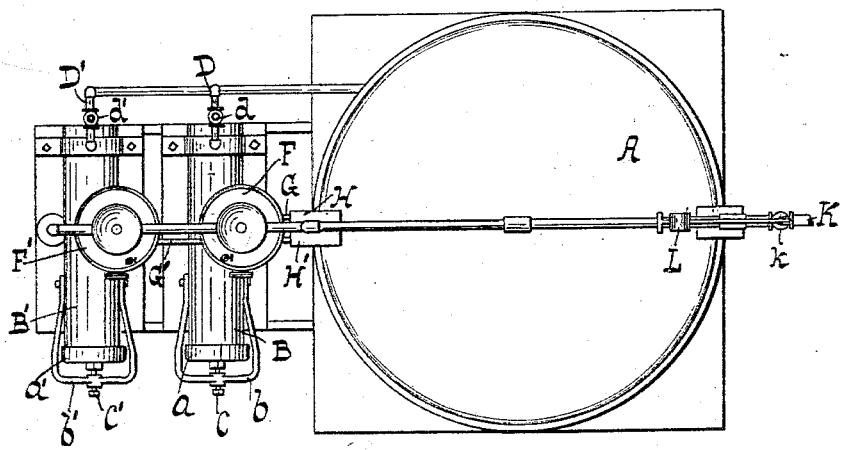
Fig. III.
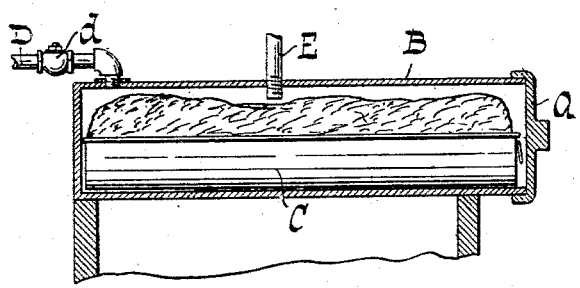
Fig. IV.
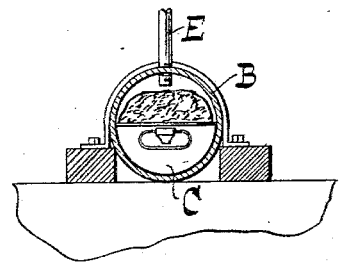
WITNESSES:
Sands F. Randall
H. E. Hill
INVENTOR
William C. Clarke
BY
Clarkson A. Collins
ATTORNEY

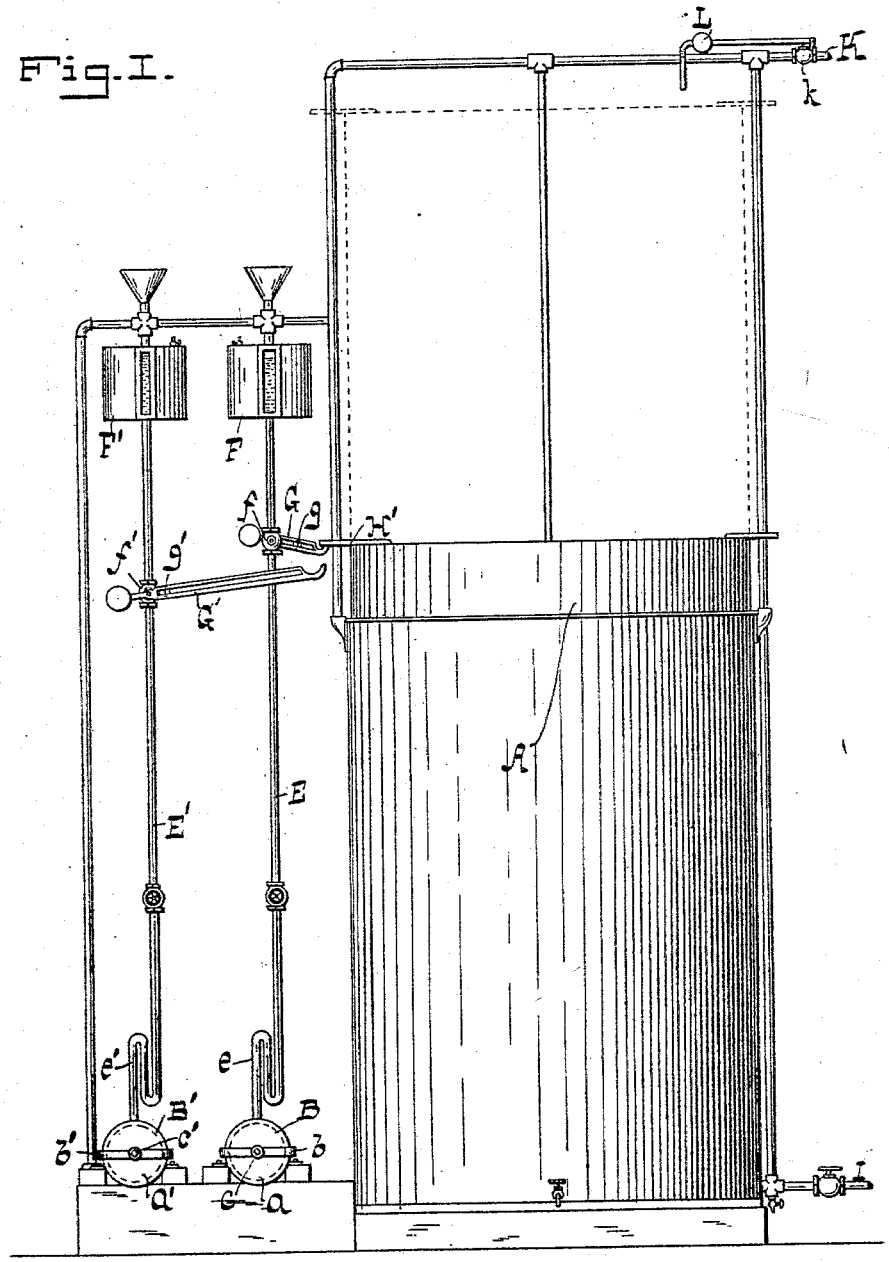

UNITED STATES PATENT OFFICE.

WILLIAM C. CLARKE, OF NEW YORK, N. Y.

METHOD OF AND APPARATUS FOR GENERATING ACETYLENE.

SPECIFICATION forming part of Letters Patent No. 556,736, dated March 24, 1896.

Application filed April 3, 1895. Serial No. 544,220. (No model.)

*To all whom it may concern:*

Be it known that I, WILLIAM C. CLARKE, a citizen of the United States, residing in the city of New York, in the county and State of New York, have invented a new and Improved Method of and Apparatus for Generating and Supplying Illuminating-Gas, of which the following is a specification.

My invention applies generally to the use of acetylene gas as an illuminating-gas, and is more especially intended to be used in connection with the production of such gas by the mutual decomposition of water and an acetylide or carbide, such as the material known as "carbide of calcium." As is well known, this material, which may be taken as a type of others of kindred composition and similar nature, when brought in contact with water is decomposed, together with the water, giving off as the gaseous product of decomposition acetylene gas. This gas burns with a flame of great brilliancy and luminosity, and hence is well adapted for use as an illuminant; and the object of my improvements is to provide a safe, simple, and convenient means and method for its production and application for illuminating purposes. To this end I use, in order to form the gas, charges or quantities of the gas-forming material of such relatively limited size that the gaseous product of each charge will be sufficient to fill, or not more than sufficient to fill, at a safe pressure an expansible gas-holder from which the gas is supplied to the burners. I also in forming the gas bring quickly into contact with such a charge or quantity of the gas-forming material a quantity of water sufficient to effect the desired decomposition, so that the whole charge is quickly decomposed and the resulting gas driven by its own pressure into the gas-holder, the solid products of decomposition remaining in the generating chamber or vessel in which the decomposition takes place, from which they can subsequently be removed.

In order to provide a supply of gas which shall be continuous and not liable to interruption by reason of the introduction of fresh charges of gas-generating material or other manipulations to which the apparatus may require to be subjected, I provide a series of generating-chambers, each of which discharges the gas generated therein into an expansible gas-holder common to all the generators and each of which is connected with a tank adapted to hold a supply of water sufficient to effect the decomposition of the contents of the generating-chamber with which it is connected when brought in contact therewith. The flow of water from the several tanks to the generating-chambers is controlled by the movement of the gas-holder in such a manner that the several generators are brought into operation in succession as gas is required.

A form of apparatus suitable for practicing my method and embodying the mechanical features of the invention is illustrated in the accompanying drawings, Figure I of which shows a side elevation, and Fig. II a plan view, of the apparatus; Fig. III, a longitudinal section, and Fig. IV a cross-section, of the generating-chamber.

Referring to the drawings, A indicates a gas-holder of any usual or suitable construction.

B B' are cylindrical generating-chambers disposed around the gas-holder A and each adapted to receive a cartridge or vessel C containing carbide of calcium or similar gas-generating material. I have shown in the drawings only two generating-chambers; but others may be added as desired, and they may be placed in any desirable or convenient positions in proximity to the holder, as in a circle around it.

The generating-chambers B are closed with caps $a$ $a'$, &c., which are held in place by swinging yokes $b$ $b'$, &c., and set-screws $c$ $c'$, &c. Each of the generating-chambers is connected by a pipe D, in which is a check-valve $d$, closing toward the chamber, with the gas-holder A. Each generating-chamber is also connected by a pipe E with a water-tank F, located above the chamber. In the pipe E is a trap or water seal $e$, to prevent the escape of gas through the pipe, and a valve $f$, to the stem of which is connected an arm G, projecting toward the gas-holder A. The arm G is so balanced that when it is raised and the valve $f$ is closed it will so remain as long as it is undisturbed, but when the center of gravity is displaced by slightly depressing the end of the arm it will fall, throwing the valve $f$ wide open and so remaining until again lifted. This may be easily accomplished by means of a weight or ball $g$, adapted to travel freely upon or within the arm. When the end of the arm G is raised the valve $f$ is closed and the ball $g$ lies at the end of the arm G which is nearest to the valve, and the center of gravity is so placed that the arm remains upraised and the valve closed. On slightly depressing the end of the arm G, however, and thus disturbing the equilibrium of the ball $g$, the ball rolls to the outer end of the arm G, throwing it down and fully opening the valve $f$, so that the contents of the tank F are quickly discharged into the chamber B.

Each of the generating-chambers B B', &c., is supplied with the same arrangement of water-tank, connecting-pipe, valve, balanced arm, &c., as is indicated by the primed letters in the drawings.

Upon the gas-holder A are carried arms H H', which project outwardly and are adapted to make contact with the ends of the arms G G', &c.

The relative elevations of the arms H H', &c., and the arms G G' are such that the arms come is contact in succession as the holder stands at different levels.

From the holder A a gas-pipe I leads to the burners to be supplied.

In order to prevent overcharging of the holder with gas, as by the accidental discharging of more than one generator at the same time, I connect with the holder a pipe K, which discharges into the open air and is normally closed by a valve $k$, to which is connected a weighted arm L. When the holder is forced by an excess of gas above its normal maximum elevation it comes in contact with the arm L, lifting it and opening the valve $k$, so that the excess of gas is discharged until the holder settles and falls away from the arm L.

In using the apparatus the holder A is first lifted, preferably by charging one of the generating-chambers with carbide of calcium and pouring into the chamber through the water-tank and connecting-pipe sufficient water to effect the decomposition of the carbide. The gaseous product of decomposition passes through the pipe D into the holder A, its escape through the pipe E being prevented by the water seal $e$ filling and lifting it. The several generating-chambers or as many of them as may be desired are then charged with the carbide, which for this purpose is preferably packed in a perforated cartridge or placed loose in vessels C, adapted to be slipped into the generating-chambers, which are then closed by means of the caps $a$ $a'$, &c., and the swinging yokes $b$ $b'$, &c., and set-screws $c$ $c'$, &c. Preferably the relative sizes of the cartridge or containing vessel and the generating-chamber and the quantity of carbide employed are so proportioned that when the carbide is decomposed the solid products of decomposition substantially fill the generating-chamber, so that all the gas produced is forced over into the gas-holder.

The valves in the pipes E E', &c., being closed by lifting the arms G G', &c., each of the tanks F F', &c., is filled with a quantity of water sufficient to effect the decomposition of the entire charge of carbide in the corresponding generating-chamber.

When by reason of the consumption of the gas holder A has so far settled that one of the arms, as H, comes in contact with the corresponding arm G, the valve $f$ controlled by the arm G is thrown open and so remains until the arm G is lifted, the water in the tank F is discharged into the generating-chamber B and all the carbide therein is decomposed, the resulting gas passing into the holder A, which is again lifted, and this operation is repeated with each of the generating-chambers in turn. The position of the arms G G', &c., at any time will indicate which of the charges have been exhausted, and the generators containing these can then at any time be cleaned out and fresh supplies of gas-forming material inserted ready to be again acted upon. The escape of gas from the holder while a generator is being recharged is prevented by the check-valve in the connecting gas-pipe, which is closed by the pressure of the gas in the holder.

While I prefer to bring together the water and carbide by discharging the former into a generating-chamber in which the latter is contained, it will be readily apparent that, as far as my method is concerned, the same results will be obtained by dropping or discharging a proper quantity of carbide into a generating-chamber in which a proper quantity of water is contained, under proper conditions, and I do not wish to limit my invention in this respect.

Such a device is particularly adapted for use is lighting small local plants, such as country houses, the apparatus being simple and economical and not liable to get out of order, and the method of operation being easily understood.

By means of my invention also I obtain a high degree of lighting efficiency from an apparatus of small size, which will occupy but little space in an ordinary cellar and can easily be set in a vault constructed outside of the building lighted, considerations of the highest practical importance. Each pound of the carbide of calcium of commerce will when combined with the proper quantity of water develop about five cubic feet of approximately two-hundred-and-forty-candle-power gas, so that with an expansible gas-holder holding only twenty-five feet, surrounded by ten small generating-chambers, each holding only five pounds of the carbide, I am able to prepare, store, and use the equivalent of three thousand feet of twenty-candle-power gas without other attention than is required for the original charging of the generating-chambers. The advantages of this will be readily apparent to those skilled in the art.

I do not claim, broadly, herein the method of generating gas, which consists in bringing together water and a metallic carbide which upon contact with water produces a fixed gas in measured quantities so proportioned as to effect the practically entire decomposition of both, since I have claimed such method in a separate application for Letters Patent filed January 21, 1896, Serial No. 576,284.

What I claim as new, and desire to secure by Letters Patent, is—

1. In a gas-generating apparatus the combination of an expansible gas-holder, a series of gas-generating chambers, a corresponding series of water-vessels and means actuated by the movements of the gas-holder for successively discharging the contents of the water-vessels into the gas-generating chambers, substantially as and for the purposes set forth.

2. The hereinbefore-described method of generating and supplying illuminating-gas, which consists in charging a series of generating-chambers severally connected with an expansible gas-holder, with a series of charges of carbide of calcium of such limited quantity that the gaseous product of the decomposition of each charge will be not more than sufficient to fill such holder and by the successive downward movements of such holder as the gas is drawn therefrom causing the discharge into each of such chambers in succession of a quantity of water sufficient to effect the decomposition of the charge therein.

3. The hereinbefore-described method of generating and supplying illuminating-gas, which consists in discharging into a generating-chamber containing a charge of carbide of calcium a quantity of water sufficient to effect the decomposition of such charge, causing the gaseous product of decomposition to pass into an expansible gas-holder and by the falling movements of such holder as the gas is drawn therefrom, effecting the successive decomposition of a series of such charges in the same manner.

4. The hereinbefore-described method of generating and supplying illuminating-gas, which consists in bringing together in a closed generating-chamber a charge of carbide of calcium and a quantity of water sufficient to effect the decomposition of such charge and discharging the gaseous products of decomposition into an expansible gas-holder and, by the downward movements of such holder as the gas is drawn therefrom, bringing together in succession a series of such charges of carbide and water whereby a series of discharges of gas into such holder is produced and a constant supply of gas is maintained.

In testimony whereof I have hereunto subscribed my name this 28th day of March, A. D. 1895.

WM. C. CLARKE.

Witnesses:
CLARKSON A. COLLINS,
SANDS F. RANDALL.